United States Patent [19]

Sakamoto et al.

[11] Patent Number: 4,805,574
[45] Date of Patent: Feb. 21, 1989

[54] IGNITION TIMING CONTROL SYSTEM FOR AN INTERNAL COMBUSTION ENGINE

[75] Inventors: Katsuhiko Sakamoto; Kouichi Hatamura; Yoshinori Okino, all of Hiroshima, Japan

[73] Assignee: Mazda Motor Corporation, Hiroshima, Japan

[21] Appl. No.: 90,898

[22] Filed: Aug. 31, 1987

[30] Foreign Application Priority Data

Sep. 8, 1986 [JP] Japan .............................. 61-210879

[51] Int. Cl.$^4$ .............................................. F02P 5/15
[52] U.S. Cl. .................................... 123/421; 123/417
[58] Field of Search ............... 123/406, 415, 416, 417, 123/421, 425, 563; 60/599

[56] References Cited

U.S. PATENT DOCUMENTS

| 4,389,994 | 6/1983 | Denz et al. | 123/417 X |
| 4,419,974 | 12/1983 | Nagase et al. | 123/421 X |
| 4,424,783 | 1/1984 | Kotwicki | 123/421 X |
| 4,485,625 | 12/1984 | Fujimoto et al. | 123/494 X |
| 4,485,626 | 12/1984 | Moriguchi et al. | 123/425 X |
| 4,633,844 | 1/1987 | Okimoto | 123/406 X |

FOREIGN PATENT DOCUMENTS 58-5471 1/1983 Japan .
58-202374 11/1983 Japan .

Primary Examiner—Tony M. Argenbright
Attorney, Agent, or Firm—Burns, Doane, Swecker & Mathis

[57] ABSTRACT

An ignition timing control system for use in an internal combustion engine equipped with a supercharger, including intake air quantity detecting means for detecting an amount of intake air flowing in an intake air passage defined at the upstream side of the supercharger, engine speed detecting means for detecting the engine speed, ignition timing control means for controlling the ignition timing on the basis of outputs from the intake air quantity detecting means and the engine speed detecting means, intake air condition detecting means for outputting a signal reflecting a substantial pressure of the intake air drawn into a combustion chamber of the engine, and correcting means for correcting the ignition timing in compliance with an output from the intake air condition detecting means.

18 Claims, 5 Drawing Sheets

IGNITION TIMING CONTROL SYSTEM FOR AN INTERNAL COMBUSTION ENGINE

CROSS-REFERENCE TO THE RELATED APPLICATIONS

The present invention is related to the inventions illustrated and described in the U.S. Pat. No. 4,633,844 patented on Jan. 6, 1987 and entitled "IGNITION TIMING CONTROL FOR A SUPER-CHARGED ENGINE", and in the co-pending filed on Apr. 23, 1986, now U.S. Pat. No. 4,714,064, and application Ser. No. 854,864 entitled "CONTROL DEVICE FOR INTERNAL COMBUSTION ENGINE", both applications being assigned to the same assignee of the present invention.

BACKGROUND OF THE INVENTION

The present invention generally relates to a control system for an internal combustion engine and more particularly, to an ignition timing control system for an internal combustion engine equipped with a supercharger.

Recently, in an internal combustion engine equipped with an electronic control system, an ignition timing is generally controlled momentarily in compliance with running conditions of the engine, with a view to preventing the knocking, to raising an engine output and to preventing a change for the worse of emission such as exhaust emission or the like.

The knocking is liable to take place, as a temperature within a combustion chamber or chambers increases. When the knocking has taken place, a thermal load within the combustion chamber increases, thus inviting a drop of the engine output, thermal damage of some parts or the like, and a noise caused by vibration is remarkably increased.

The knocking has a close connection with the ignition timing. When the ignition timing is advanced, the knocking is liable to arise, since the temperature within the combustion chamber increases due to improvement of the combustion efficiency. On the contrary, when the ignition timing is delayed, the knocking hardly arises, since the temperature and pressure within the combustion chamber are lowered.

Although it is well known that the knocking is liable to arise as an intake air temperature becomes higher, the knocking is hard to occur as the intake air becomes higher in humidity.

It is also known that the knocking is hard to take place in summer rather than in winter under the influence of density or humidity of the ambient air, notwithstanding the fact that the temperature thereof is generally high in summer.

One of the ignition timing control systems of the engine is disclosed, for example, in Japanese Patent Laid-open Application (Tokkaisho) No. 58-202374, in which the ignition timing is advanced by a prescribed angle in summer rather than in winter, in view of the fact that the knocking is hard to arise in summer.

In the case where the engine is equipped with a supercharger, the knocking is liable to arise due to improvement of the combustion characteristics following a rise of the intake air temperature caused by the boosting and improvement of the charging efficiency.

Japanese Patent Laid-open Application (Tokkaisho) No. 58-5471 also discloses the ignition timing control system of the engine which is capable of correcting the ignition timing towards the side of spark retardation, with a view to preventing the knocking at the time when the intake air temperature at the downstream side of the supercharger exceeds a predetermined value.

In the engine equipped with the supercharger, it is not uncommon, to further heighten the charging efficiency, that an inter-cooler is generally provided at the downstream side of the supercharger so that the intake air raised both in pressure and in temperature by the boosting may be cooled by the inter-cooler. In the case where the supercharger is a turbocharger, the boosting capability varies remarkably in connection with an engine speed. Furthermore, in the case where the inter-cooler is of an air cooled one, the cooling capability thereof also considerably varies.

Accordingly, upon detection of an amount increased in the charging efficiency caused by the boosting, it has been extremely difficult to correct the ignition timing towards the side of spark retardation in compliance with the amount increased in the charging efficiency.

In the ignition timing control system disclosed in the above-mentioned Application No. 58-202374, since the ignition timing is controlled on the basis of the temperature of the intake air i.e., the ambient air drawn into an intake air passage, it is possible to execute the control, for example, for advancing the ignition timing by a prescribed angle in compliance with atmospheric conditions in summer. This kind of ignition timing control system, however, includes a disadvantage in that the ignition timing is not accurately controlled in accordance with an amount of temperature variation of the intake air caused by the supercharger and the inter-cooler, even if this kind of ignition timing control system is applied to the engine equipped with the supercharger and the inter-cooler. Furthermore, it is actually impossible to detect the conditions such as the pressure, temperature or the like of the intake air drawn into the combustion chamber only through detection of the ambient temperature by an intake air thermo-sensor disposed in the vicinity of an air flowmeter. Accordingly, it is substantially impossible to correct the ignition timing in view of the influence of the boosting.

Moreover, the ignition timing control system disclosed in the aforementioned Application No. 58-5471 is of the type employed in the engine equipped with the supercharger and has been developed merely on the basis of an idea such that the ignition timing is corrected by an amount increased in the intake air temperature after the boosting. In addition, since the ignition timing is controlled in compliance with the intake air temperature at the downstream side of the supercharger, it is disadvantageously impossible to accurately correct the ignition timing in accordance with the atmospheric conditions.

SUMMARY OF THE INVENTION

Accordingly, the present invention has been developed with a view to substantially eliminating the above described disadvantages inherent in the prior art ignition timing control system for an internal combustion engine, and has for its essential object to provide an improved ignition timing control system for an internal combustion engine which is capable of improving the combustion characteristics and of preventing the knocking.

Another important object of the present invention is to provide an ignition timing control system of the above described type which is capable of controlling the ignition timing in compliance with variation of the charging efficiency by the boosting.

A further object of the present invention is to provide an ignition timing control system of the above described type which is capable of setting the most suitable ignition timing in view of both of atmospheric conditions such as humidity, temperature or the like and intake air conditions drawn into a combustion chamber or chambers of the engine.

Figure 1:
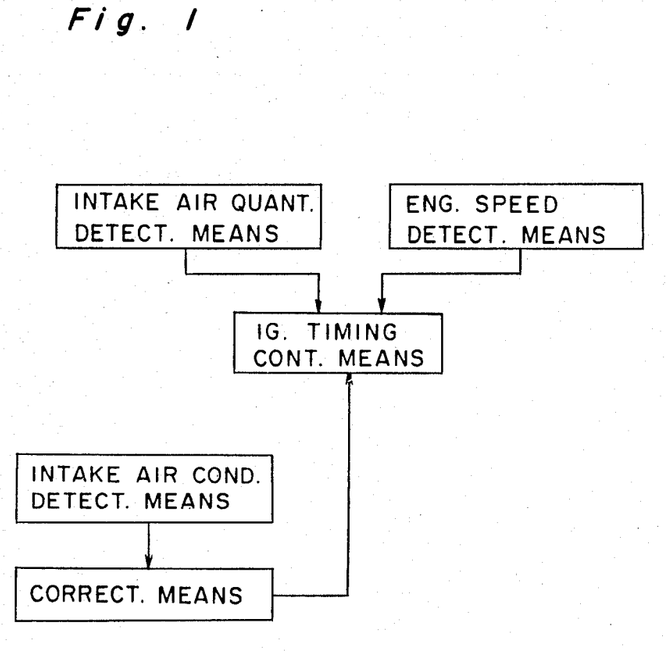
FIG. 1 is a functional block diagram of an ignition timing control system of the present invention.

In accomplishing these and other objects, according to one preferred embodiment of the present invention, there is provided an ignition timing control system for use in an internal combustion engine equipped with a supercharger, which is substantially illustrated in a block diagram as shown in FIG. 1 and includes intake air quantity detecting means for detecting an amount of intake air flowing in an intake air passage defined at the upstream side of the supercharger, engine speed detecting means for detecting the engine speed, ignition timing control means for controlling the ignition timing on the basis of outputs from the intake air quantity detecting means and the engine speed detecting means, intake air condition detecting means for outputting a signal reflecting a substantial pressure of the intake air drawn into the combustion chamber of the engine, and correcting means for correcting the ignition timing in compliance with an output from the intake air condition detecting means.

In the ignition timing control system of the engine according to the present invention, when the amount of intake air flowing in the intake air passage defined at the upstream side of the supercharger is detected by the intake air quantity detecting means and the engine speed is detected by the engine speed detecting means, the ignition timing is controlled by the ignition timing control means on the basis of the amount of intake air and the engine speed.

Thereafter, when the intake air condition detecting means has outputted the signal reflecting the substantial pressure of intake air drawn into the combustion chamber, the ignition timing is corrected by the correcting means on the basis of this signal.

As described above, in the case where the ignition timing is set on the basis of the engine speed and the amount of intake air flowing in the intake air passage defined at the upstream side of the supercharger, the knocking is liable to take place unless the ignition timing is corrected towards the side of spark retardation by an amount increased in the charging efficiency through the boosting. However, since the amount increased of the charged air is known by the signal reflecting the substantial pressure of the intake air drawn in the combustion chamber, it makes possible to correct the ignition timing corresponding to such amount increased.

By the ignition timing control system of the engine according to the present invention, it is made possible to set and control the ignition timing on the basis of the engine speed and the signal indicative of the amount of intake air, both of which are available in controlling fuel injection of the engine. Furthermore, in view of the variation of the charging efficiency through the boosting or supercharging of intake air, the ignition timing can be controlled with the use of the intake air condition detecting means of a simple construction composed, for example, of the first intake air thermo-sensor for detecting the intake air temperature before the boosting which is required for the correction of the intake air density, and the second intake air thermo-sensor for detecting the intake air temperature after the boosting.

Moreover, in another aspect of the present invention, the ignition timing control system includes running condition detecting means for detecting running conditions of the engine, basic ignition timing setting means for setting a basic ignition timing in compliance with an output from the running condition detecting means, a first intake air thermo-sensor disposed in an intake air passage defined at the upstream side of the supercharger, a second intake air thermo-sensor disposed in an intake air passage defined at the downstream side of the supercharger to detect a substantial temperature of the intake air drawn into the combustion chamber of the engine, first correction value setting means for setting a correction value of the ignition timing in compliance with an output from the first intake air thermo-sensor, second correction value setting means for setting another correction value of the ignition timing in a different way as in the first correction value setting means in compliance with a difference between outputs from the first and second intake air thermo-sensors, correcting means for correcting the basic ignition timing on the basis of the correction values of the ignition timing set by both of the first and second correction value setting means, and ignition control means for executing the ignition at the ignition timing corrected by the correcting means.

By the above described construction of the present invention, the basic ignition timing is set by the basic ignition timing setting means in compliance with the running conditions of the engine detected by the running condition detecting means.

When the intake air temperature at the upstream side of the supercharger and the substantial temperature of the intake air drawn into the combustion chamber are detected respectively by the first and second intake air thermo-sensors, the first correction value setting means sets the correction value of the ignition timing in compliance with the output from the first intake air thermo-sensor, and the second correction value setting means sets another correction value of the ignition timing in a different way as in the first correction value setting means in compliance with the difference between the outputs from the first and second intake air thermo-sensors. Thereafter, when the correcting means has corrected the basic ignition timing on the basis of the correction values of the ignition timing set by both correction value setting means, the ignition control means fires a spark plug at the ignition timing corrected by the correcting means.

As described so far, not only a correction value of the ignition timing is determined in compliance with the ambient air temperature detected by the first intake air thermo-sensor, but also another correction value of the ignition timing is determined on the basis of the difference between the first and second intake air thermo-sensors in view of influence by the supercharger and the intercooler. The basic ignition timing is, then, corrected in accordance with these correction values. Accordingly, it is capable of accurately controlling the ignition timing in view of the influence by the ambient air and the supercharger, thus resulting in that the combustion characteristics can be desirably improved and the knocking can be prevented.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENT

Referring now to the drawings, one preferred embodiment of the present invention will be described hereinafter, in which a four-stroke, four-cylinder fuel injection type vertical internal combustion engine is referred to as an example.

Figure 2:
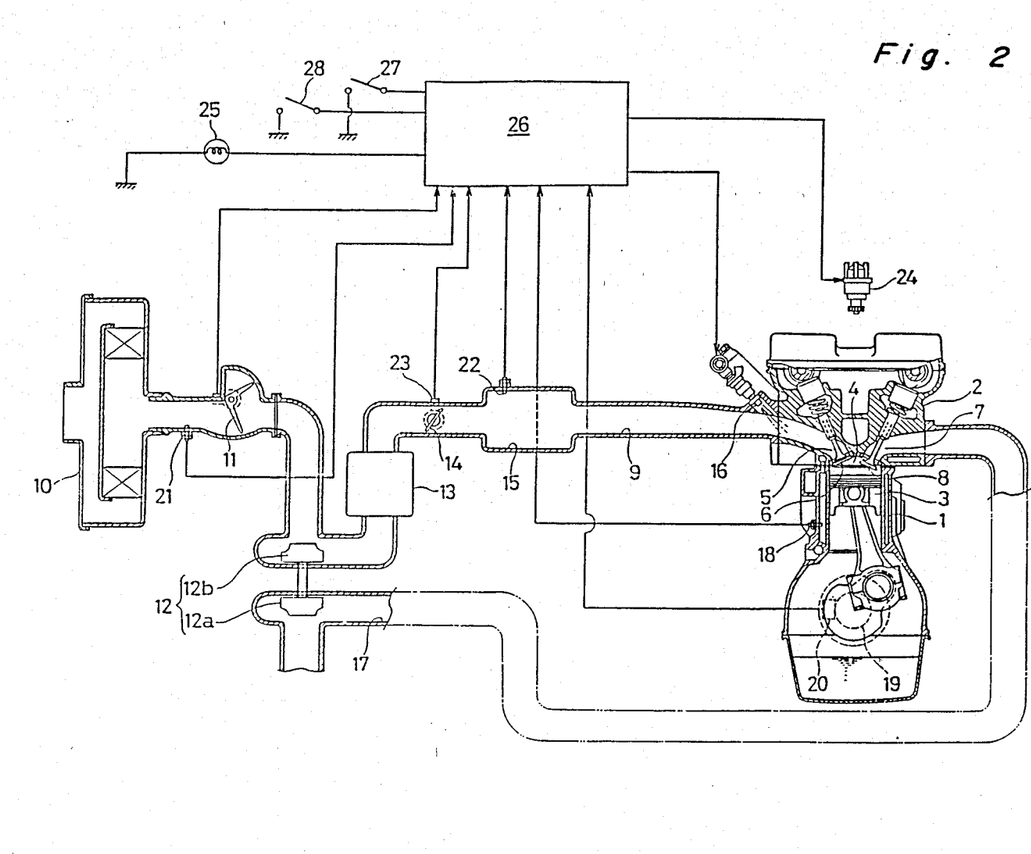
FIG. 2 is a schematic view showing the whole construction of the ignition timing control system according to one preferred embodiment of the present invention.

As shown in FIG. 2, the engine is primarily composed of a cylinder block 1, a cylinder head 2, a plurality of pistons 3 (four pistons in this embodiment) and the like, with each of a plurality of combustion chambers 4 being defined by these three members 1, 2 and 3. The engine is further provided with an air cleaner 10 disposed at the upstream end of an intake air passage 9 communicating with a suction port 5 defined in each cylinder, a supercharger 12 primarily composed of a turbine 12a and a compressor 12b, and an inter-cooler 13 disposed in the course of the intake air passage 9, with the compressor 12b of the supercharger 12 being provided in the intake air passage 9 between the air cleaner 10 and the inter-cooler 13. A suction valve 6 for opening and closing the downstream end of the suction port 5 and an exhaust valve 8 for opening and closing the upstream end of an exhaust port 7 are reciprocably mounted on the cylinder head 2 at every cylinder. There are successively arranged in the course of the intake air passage 9 from the upstream side towards the downstream side thereof, an intake air quantity detecting sensor 11 of a measuring plate type, the compressor 12b of the supercharger 12, the inter-cooler 13, a throttle valve 14 and a surge tank 15. An injector 16 for injecting fuel towards the suction port 5 is securely mounted at a downstream portion of each intake air branch pipe which is provided at an intake air manifold portion of an intake air pipe forming the aforementioned intake air passage 9.

Meanwhile, each exhaust port 7 is collectively introduced into one exhaust gas passage 17, in the course of which the turbine 12a of the supercharger 12 is rotatably mounted.

Furthermore, the engine is also provided with various kinds of sensors such as a water thermo-sensor 18, a speed sensor 20, a first intake air thermo-sensor 21, a second intake air thermo-sensor 22 and a throttle opening detecting sensor 23, in addition to the above-mentioned intake air quantity detecting sensor 11. The water thermo-sensor 18 is secured to the cylinder block 1 to detect a temperature of cooling water within a water jacket of the cylinder block 1. The speed sensor 20, for example, of an electromagnetic pickup type is disposed in the vicinity of a crank shaft 19 in association therewith to output a signal indicative of its speed (a signal indicative of a crank angle) every 180° revolution of the crank shaft 19. The first intake air thermo-sensor 21 is mounted on the intake air passage 9 in the vicinity of the air cleaner 10 to detect a temperature of the intake air, and the second intake air thermo-sensor 22 is mounted on the surge tank 15 to detect the temperature of the intake air boosted by the supercharger 12 and cooled by the inter-cooler 13. The throttle opening detecting sensor 23, for example, in the form of a potentiometer is provided in association with a valve shaft of the throttle valve 14 to detect the opening thereof.

Moreover, an idle switch (not shown) is provided on the throttle valve 14 so that it may be kept on until the throttle valve 14 is opened to a predetermined amount when an accelerator pedal has been slightly depressed, and turned off when the throttle valve 14 has been opened over the predetermined amount.

A control unit 26, as will be henceforth described in detail, controls a distributor 24, the injectors 16, an ignitor 30 and a warning lamp 25 by receiving the signals sent from the aforementioned sensors 11, 18, 20, 21, 22 and 23 or the like. The control unit 26 also receives signals from an inhibitor switch 27 and from a gear switch 28, and a voltage signal from a battery, with the gear switch 28 being mounted on a transmission to detect whether or not the gears are engaged.

Figure 3:
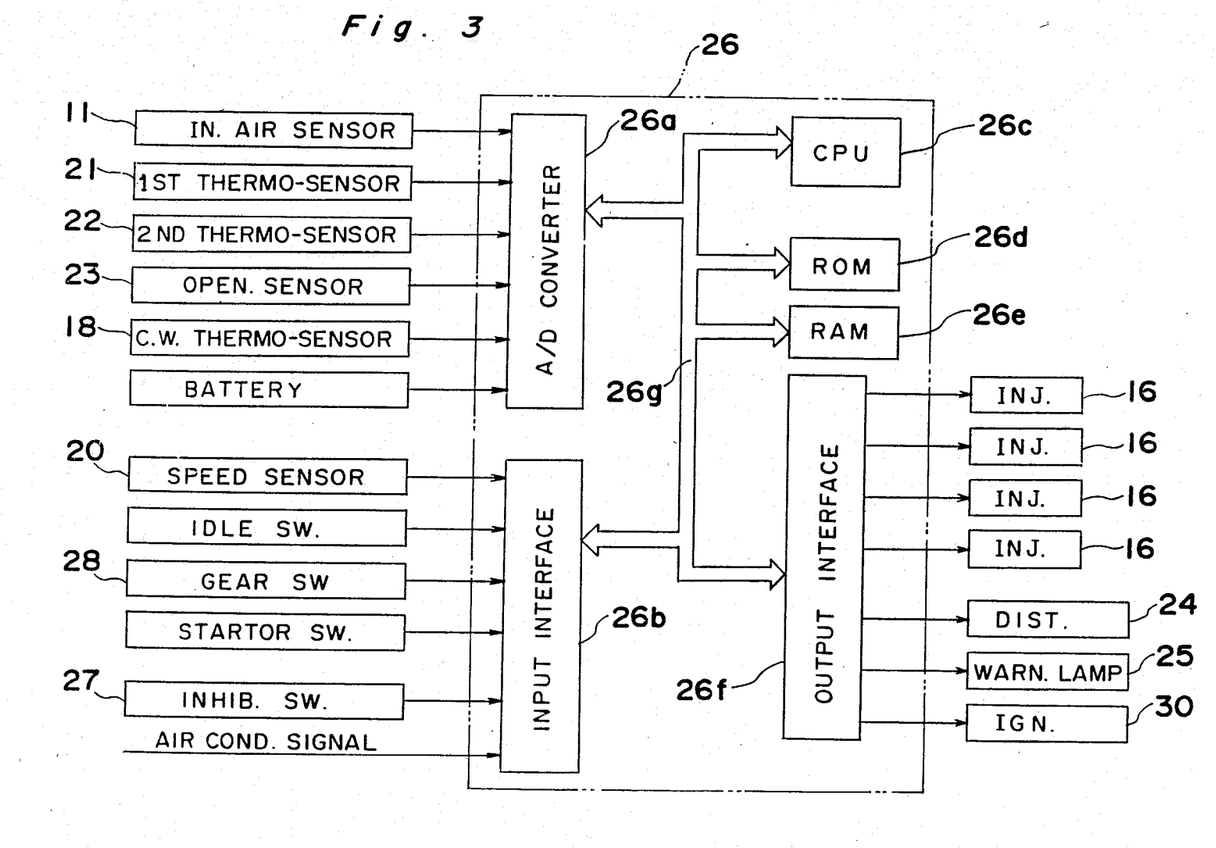
FIG. 3 is a block diagram of the ignition timing control system such as a control unit and the like of FIG. 2.

As shown in FIG. 3, the control unit 26 is provided with a CPU (central processing unit) 26c, an A/D converter (analog-to-digital converter) 26a for executing the A/D conversion with respect to the signals from the sensors 11, 18, 20, 21, 22 and 23 and the battery to output them into the CPU 26c, an input interface 26b for receiving the signals from the speed sensor 20 and the switches 27 and 28 or the like to output them into the CPU 26c, a ROM (read only memory) 26d, a RAM (random access memory) 26e and an output interface 26f for outputting signals to actuate the injectors 16, the ignitor 30, the distributor 24 or the like in accordance with signals outputted from the CPU 26c. The A/D converter 26a, input interface 26b, ROM 26d, RAM 26e and output interface 26f are connected to the CPU 26c through a bus line structure 26g including a control bus, an address bus and a data bus.

Control programs for controlling an ignition or an ignition timing, a memory map or other control programs, and the like are inputted in advance into and stored in the ROM 26d, with the ignition timing control program being described hereinafter.

The RAM 26e is provided with a plurality of memories including a memory for flag use, a memory for counter use and the like, for once storing various kinds of data as occasion demands.

The present invention is characterized in the ignition timing control of the internal combustion engine whereby the ignition timing is corrected in accordance with the temperature detected by the first intake air thermo-sensor 21 (referred to as AFM intake air temperature Ta hereinafter) and the temperature detected by the second intake air thermo-sensor 22 (referred to as ST intake air temperature Te hereinafter). The AFM and ST mean an air flow meter and the surge tank, respectively.

An angle of spark retardation $\theta a$ to be corrected on the basis of the temperature and pressure of the intake air is derived by the following equation:

$$\theta a = A(Te-Ta) - B \cdot Ta + C(Te-Ta) + D \quad (1)$$

The A, B and C used in the equation (1) are coefficients determined experimentally and expressed as $A = fa(N)$, $B = fb(N)$ and $C = fc(N)$, with the engine speed N being employed as a parameter.

The first term $A(Te-Ta)$ in the equation (1) is the one for correcting a temperature increase (Te-Ta) with respect to the AFM intake air temperature Ta of the intake air drawn into the combustion chamber after it has been boosted by the supercharger and cooled by the inter-cooler. Since the basic ignition timing, as will be henceforth described, is determined on the basis of the AFM intake air temperature Ta, the ignition timing is corrected towards the side of spark retardation by the amount corresponding to the liability of knocking due to the temperature increase (Te-Ta) in the supercharger and the inter-cooler.

The second term $(-B \cdot Ta)$ in the equation (1) is the one for conducting the correction in accordance with atmospheric conditions on the basis of the AFM intake air temperature substantially similar to the ambient temperature. That is to say, since the AFM intake air temperature reflects the temperature, humidity and pressure of the atmosphere, the knocking hardly takes place in summer due to the fact that the ambient temperature and humidity are high and the atmospheric pressure is low, and on the contrary, the knocking is liable to arise in winter due to the fact that the ambient temperature and humidity are low and the atmospheric pressure is high. In view of these facts, the ignition timing is corrected towards the side of spark advance as the AFM intake air temperature Ta increases.

The third term $C(Te-Ta)$ in the equation (1) is the one for correcting the ignition timing on the basis of a signal (Te-Ta) reflecting a substantial pressure of the intake air drawn into the combustion chamber.

In other words, although the boost pressure and the temperature increase by the boosting are determined in accordance with the engine speed N, the temperature and pressure of the intake air are lowered to some extent as a result of being cooled down by the inter-cooler. Accordingly, (Te-Ta) reflects the substantial pressure of the intake air drawn into the combustion chamber.

Since the charging efficiency of the intake air led into the combustion chamber varies in compliance with the amount of pressure rise of the boosted intake air, i.e., the amount of temperature rise (Te-Ta), the ignition timing is corrected in accordance with the variation of the charging efficiency.

That is to say, when the pressure rise by the boosting becomes large, the amount of air to be charged is caused to increase. As a result, since the knocking is liable to take place, it is necessary to correct the ignition timing towards the side of spark retardation.

The fourth term D in the equation (1) is an offset value determined in view of an MBT (Min. Advanced for Best Torque) and a knock limit.

Figure 4A:
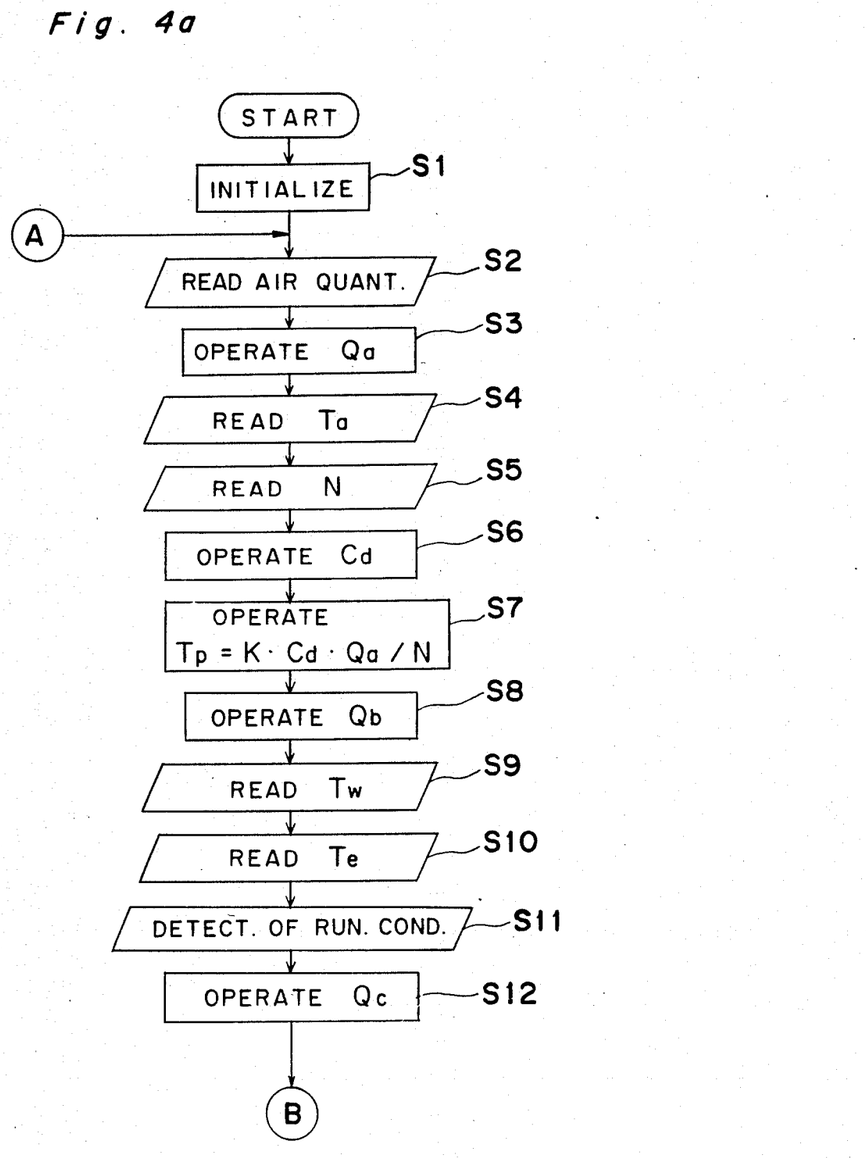
FIGS. 4a and 4b are flow-charts for schematically illustrating a routine of the ignition timing control executed in the control unit.
Figure 4B:
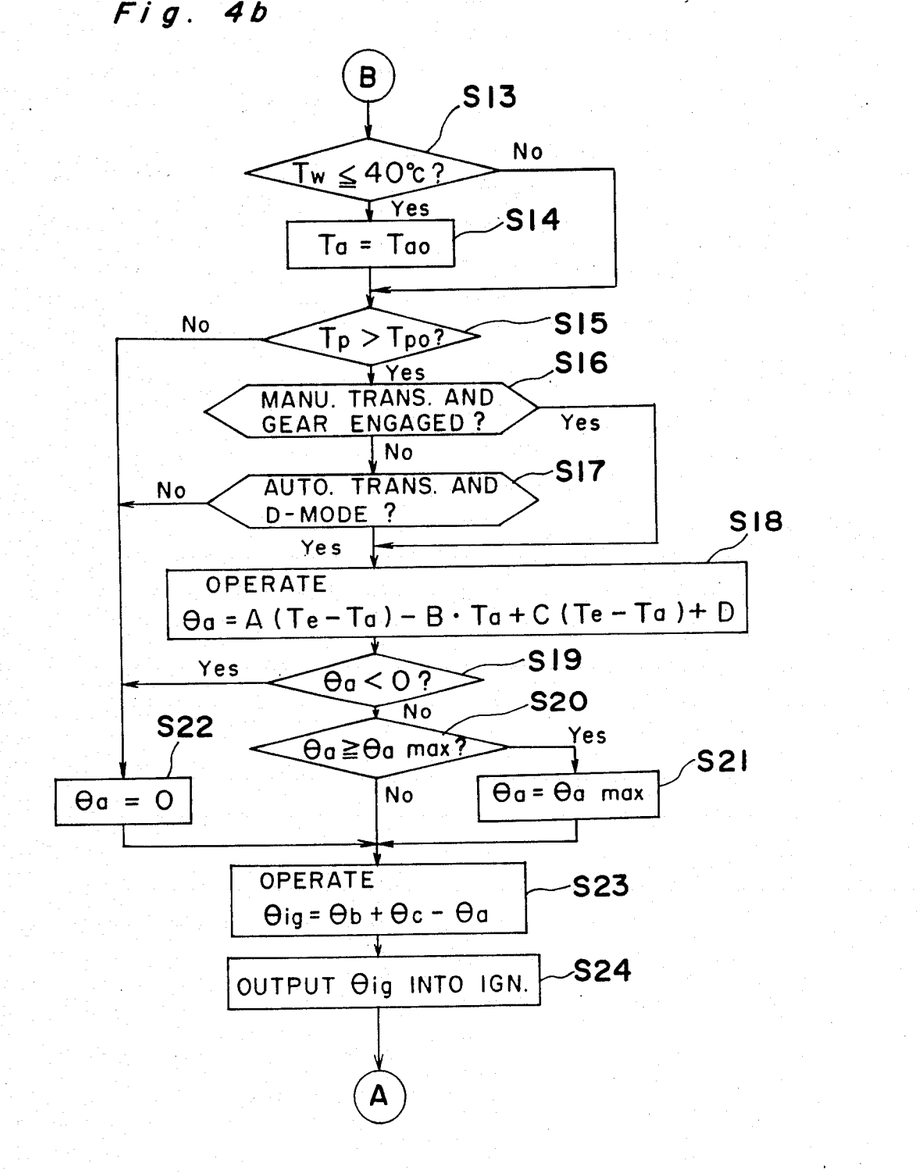

A routine of the ignition timing control of this embodiment will be described hereinafter with reference to flow-charts as shown in FIGS. 4a and 4b.

Upon commencement of the control following the starting of the engine, the initialize for clearing the memories or the like is executed at step S1 followed by step S2 at which a signal indicative of the amount of intake air or intake air quantity and sent from the intake air quantity detecting sensor 11 is read in. The amount of intake air Qa per each cylinder is, then, operated in accordance with the signal thereof at step S3.

Subsequently, a signal indicative of the AFT intake air temperature Ta and sent from the first intake air thermo-sensor 21 is read in at step S4 and the latest engine speed N stored in a memory is also read in therefrom at step S5, while a signal indicative of the engine speed and sent from the speed sensor 20 is operated through interruption processing whenever it is inputted, so that the latest engine speed N may be stored in the memory.

At step S6, a density correction coefficient Cd is operated on the basis of the AFT intake air temperature Ta with the use of the memory map or an operational formula including the AFT intake air temperature Ta as a parameter.

At next step S7, the amount of air Tp to be charged into each cylinder is operated on the basis of a predetermined constant K, the density correction coefficient Cd, the amount of intake air Qa and the engine speed N by using such operational formula as $Tp = K \cdot Cd \cdot Qa/N$. A basic angle $\theta b$ of spark advance from the compression TDC (Top Dead Center) is operated, at step S8, in accordance with the engine speed N and the amount of air Tp to be charged, with the use of a memory map or an operational formula including N and Tp as parameters.

A signal Tw of the cooling water temperature sent from the water thermo-sensor 18 and a signal Te of the ST intake air temperature sent from the second intake air thermo-sensor 22 are read in at steps S9 and S10, respectively. A running condition such as idling, acceleration or the like is detected, at step S11, on the basis of a signal from the idle switch, a signal indicative of the opening of the throttle valve, the engine speed N or the like. An angle $\theta c$ of spark advance to be corrected is, then, operated in accordance with the running condition at step S12. Such spark advance $\theta c$ includes the correction of spark retardation during acceleration, that during idling and the like, and is determined by a prescribed memory map or through a certain operation. This kind of the correction executed on the basis of the running condition is substantially similar to that executed in general.

Subsequently, at step S13, it is judged whether or not the temperature of the cooling water Tw is less than 40° C. When Tw is less than 40° C., the procedure proceeds to step S14, and when Tw is greater than or equal to 40° C., the procedure proceeds to step S15. At step S14, the AFT intake air temperature Ta is set to a predetermined value Tao, since the combustion becomes unsteady in the case where the ignition timing is excessively corrected towards the side of spark advance before the warm-up of the engine.

It is judged at step S15 whether or not the amount of charged air Tp is greater than a predetermined value Tpo. When Tp is greater than Tpo, the procedure proceeds to step S16, and on the contrary, when Tp is less than or equal to Tpo, the procedure proceeds to step S22. The aforementioned Tpo is a value corresponding to the amount of charged air at the time when the throttle valve 14 is nearly fully opened, and the correction of spark retardation is executed on the basis of the temperature and pressure of the intake air only in a region satisfying a condition such that Tp is greater than Tpo. At step S16, it is judged whether or not the motor vehicle is provided with a manual transmission and gears disposed in the transmission are engaged. The fact whether the motor vehicle is provided with the manual transmission or an automatic one is judged by a setting condition of a port of the CPU 26c and on the other hand, the fact whether or not the gears are engaged is judged on the basis of a signal sent from the gear switch 28.

The procedure proceeds to step S18 or S17, when the judgment at step S16 is YES or NO, respectively.

Although it is judged at step S17 whether or not the motor vehicle is equipped with the automatic transmission and a shift lever (not shown) for selecting either one of operable modes is at a D-position (driving mode), the judgment whether or not the shift lever is at the D-position is executed on the basis of a signal sent from a shift lever switch provided on the shift lever. Consequently, when the judgment at step S17 is YES, the procedure proceeds to step S18, and on the contrary, when the judgment is NO, the procedure proceeds to step S22.

At subsequent step S18, the angle of spark retardation $\theta a$ to be corrected on the basis of the temperature and pressure of the intake air is operated with the use of the equation (1).

The coefficients A, B and C are determined by the memory map or the operational formulas each including the engine speed as a parameter. The offset value D is a predetermined one as described hereinbefore.

It is judged at step S19 whether or not the corrected spark retardation $\theta a$ is less than 0. When $\theta a$ is less than 0, the procedure proceeds to step S 22, and when $\theta a$ is greater than or equal to 0, the procedure proceeds to step S20, at which it is judged whether or not $\theta a$ is greater than or equal to a predetermined tolerable value $\theta a max$. When the judgment at step S20 is NO, the procedure proceeds to step S23, and on the contrary, when the judgment at step S20 is YES, the procedure proceeds to step S21 at which $\theta a$ is rendered to be $\theta a max$ and thereafter, the procedure proceeds from step S21 to step S23.

In the case where the procedure has proceeded to step S22 from either of steps S15, S17 and S19, $\theta a$ is rendered to be 0 and thereafter, the procedure proceeds to step S23.

At step S23, the ignition timing $\theta ig$ from the compression TDC towards the side of spark advance is operated with the use of an operational formula as indicated by $\theta ig = \theta b + \theta c - \theta a$. Subsequently, an ignition signal at the ignition timing of $\theta ig$ is outputted into the ignitor 30 and thereafter, the procedure returns to step S2 from step S24. It is to be noted that the control for outputting the ignition signal indicative of the ignition timing $\theta ig$ determined at step S23 into the ignitor 30 is substantially similar to that of the engine equipped with the ordinary electronic control system. It is further to be noted that a loop from step S2 to step S24 in the aforementioned routine is repeated every minute period such as 1 msec.

It is also to be noted that in addition to the first and second intake air thermo-sensors 21 and 22, a pressure sensor for detecting the pressure of the intake air drawn into the engine may be provided and the amount to be corrected with respect to a quantitative fluctuation of the charged air, i.e., the amount indicated by the third term in the equation (1) may be detected with the use of the above-mentioned pressure signal and the ST intake air temperature.

As described so far, in the ignition timing control of the present invention, the ignition timing is corrected by the angle of spark retardation $\theta a$ collectively including the correction of spark retardation in compliance with the temperature increase caused by the boosting, that of spark advance in compliance with the atmospheric condition and that of spark retardation in compliance with the increase of the charging efficiency caused by the boosting, on the basis of the AFT and ST intake air temperatures Ta and Te substantially close to the ambient temperature. As a result, the ignition timing is accurately set in compliance with the atmospheric condition and the intake air condition after the boosting, and the combustion properties in the engine are improved, i.e., the output of the engine is raised, with the liability of the knocking being desirably reduced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An ignition timing control system for use in an internal combustion engine equipped with a supercharger, which comprises:
   intake air quantity detecting means for detecting an amount of intake air flowing in an intake air passage defined at an upstream side of the supercharger;
   engine speed detecting means for detecting speed of the engine;
   ignition timing control means for controlling timing of the ignition on the basis of outputs from said intake air quantity detecting means and said engine speed detecting means;
   intake air condition detecting means for transmitting a signal indicative of a substantial pressure of the intake air drawn into a combustion chamber of the engine;
   correcting means for correcting the ignition timing in compliance with an output from said intake air condition detecting means; and
   an inter-cooler being interconnected between said supercharger and said intake air condition detecting means.

2. An ignition timing control system as claimed in claim 1, wherein said intake air condition detecting means detects the conditions of intake air within a surge tank provided at the downstream side of said inter-cooler.

3. An ignition timing control system as claimed in claim 2, wherein said intake air condition detecting means is an intake air thermo-sensor.

4. An ignition timing control system as claimed in claim 3, wherein a throttle valve is connected between said inter-cooler and said surge tank.

5. An ignition timing control system as claimed in claim 3, wherein said correcting means corrects the ignition timing so that the higher the detected intake air temperature the more the ignition timing is retarded.

6. An ignition timing control system as claimed in claim 1, wherein said correcting means corrects the ignition timing so that the higher the intake air pressure detected by said intake air condition detecting means, the more the ignition timing is retarded.

7. An ignition timing control system as claimed in claim 1, wherein said intake air condition detecting means is an intake air thermo-sensor for detecting a temperature of the intake air at the downstream side of the supercharger.

8. An ignition timing control system as claimed in claim 1, further comprising means for inhibiting the correction of the ignition timing when an engine load is below a predetermined level.

9. An ignition timing control system as claimed in claim 1, further comprising means for inhibiting the correction of the ignition timing when temperature of cooling water is below a predetermined value.

10. An ignition timing control system as claimed in claim 9, wherein the ignition timing is corrected by a predetermined value set in advance.

11. An ignition timing control system as claimed in claim 1, further comprising means for inhibiting the correction of the ignition timing during idling.

12. An ignition timing control system for use in an internal combustion engine equipped with a supercharger, which comprises:
running condition detecting means for detecting running conditions of the engine;
basic ignition timing setting means for setting a basic ignition timing in compliance with an output from said running condition detecting means;
a first intake air thermo-sensor disposed in an intake air passage defined at the upstream side of the supercharger;
a second intake air thermo-sensor disposed in an intake air passage defined at the downstream side of the supercharger to detect a substantial temperature of the intake air drawn into a combustion chamber of the engine;
first correction value setting means for setting correction value of the ignition timing in compliance with an output from said first intake air thermo-sensor;
second correction value setting means for setting another correction value of the ignition timing in a different way as in said first correction value setting means in compliance with a difference between outputs from said first and second intake air thermo-sensors;
correcting means for correcting the basic ignition timing on the basis of the correction values of the ignition timing set by both of said first and second correction value setting means; and
ignition control means for executing the ignition at the ignition timing corrected by said correcting means.

13. An ignition timing control system as claimed in claim 12, wherein an inter-cooler is disposed at the downstream side of the supercharger and at the upstream side of said second intake air thermo-sensor.

14. An ignition timing control system as claimed in claim 13, wherein said second intake air thermo-sensor detects a temperature within a surge tank provided at the downstream side of said inter-cooler.

15. An ignition timing control system as claimed in claim 12, wherein said running condition detecting means includes intake air quantity detecting means for detecting an amount of intake air at the upstream side of the supercharger and engine speed detecting means for detecting the engine speed.

16. An ignition timing control system as claimed in claim 12, wherein said second correction value setting means sets the correction value of the ignition timing so that the larger the temperature difference between the upstream and downstream sides of the supercharger, the greater an angle of spark retardation.

17. An ignition timing control system as claimed in claim 12, wherein said first correction value setting means sets the correction value of the ignition timing so that the higher the temperature at the upstream side of the supercharger, the greater an angle of spark retardation.

18. An ignition timing control system for use in an internal combustion engine equipped with a supercharger, which comprises:
running condition detecting means for detecting running conditions of the engine;
basic ignition timing setting means for setting a basic ignition timing in compliance with an output from said running condition detecting means;
a first intake air thermo-sensor disposed in an intake air passage defined at the upstream side of the supercharger;
a second intake air thermo-sensor disposed in an intake air passage defined at the downstream side of the supercharger to detect a substantial temperature of the intake air drawn into a combustion chamber of the engine;
ignition timing correcting means for executing the correction of the ignition timing on the basis of outputs from said first and second intake air thermo-sensors, said correction including a spark retardation in compliance with a temperature rise created by supercharging the intake air, a spark advance in compliance with atmospheric conditions and a spark retardation in compliance with a rise of the charging efficiency created by supercharging the intake air; and
ignition control means for executing the ignition at the ignition timing corrected by said ignition timing correcting means.

* * * * *